(No Model.)
W. C. DAVIDSON.
POTATO PLANTER.
No. 358,188. Patented Feb. 22, 1887.
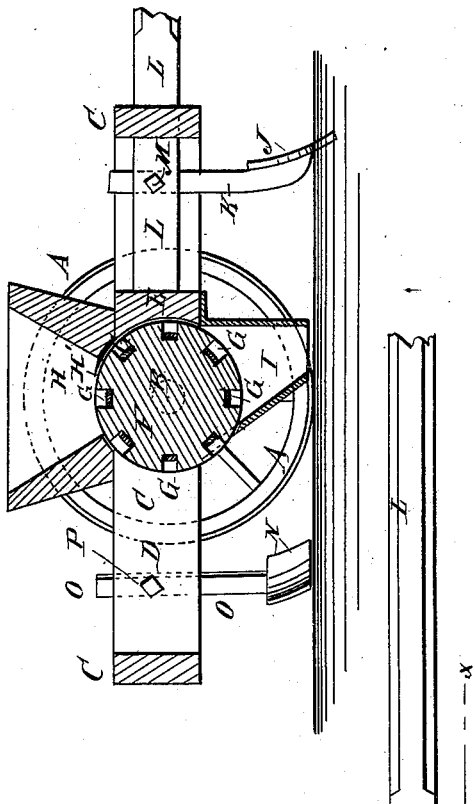
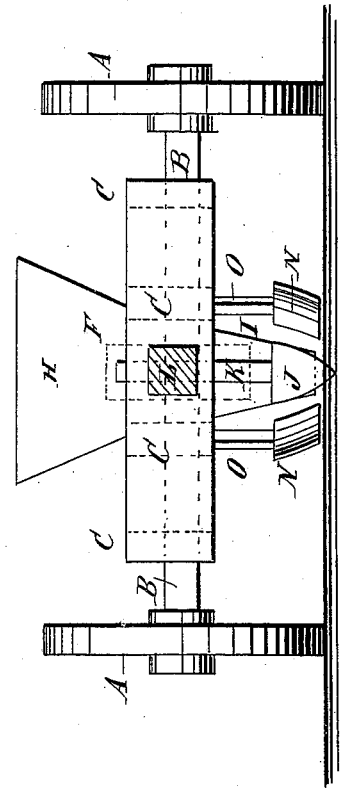
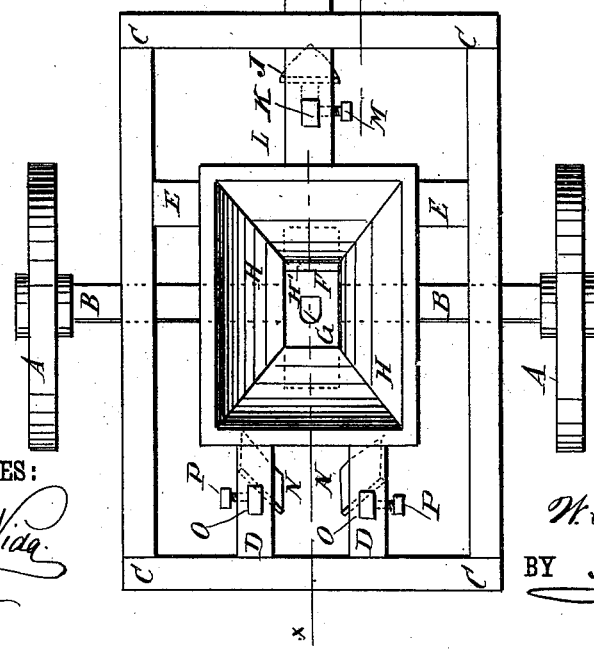
WITNESSES:
Chas. Nida.
C. Sedgwick
INVENTOR:
W. C. Davidson
BY Munn & Co.
ATTORNEYS.

United States Patent Office.

WILLIAM CARLISLE DAVIDSON, OF GRANDVILLE, MICHIGAN.

POTATO-PLANTER.

SPECIFICATION forming part of Letters Patent No. 358,188, dated February 22, 1887.

Application filed July 30, 1886. Serial No. 209,536. (No model.)

*To all whom it may concern:*

Be it known that I, WILLIAM CARLISLE DAVIDSON, of Grandville, in the county of Kent and State of Michigan, have invented a new and useful Improvement in Potato-Planters, of which the following is a full, clear, and exact description.

Reference is to be had to the accompanying drawings, forming part of this specification, in which similar letters of reference indicate corresponding parts in all the figures.

Figure 1 is a plan view of my improved potato-planter, part of the tongue being broken away. Fig. 2 is a sectional side elevation of the same, taken through the line $x\ x$, Fig. 1. Fig. 3 is a front elevation of the same, the tongue being shown in section.

The object of this invention is to provide potato-planters constructed in such a manner as to open furrows to receive the seed, drop the seed, cover the seed, press the soil down upon the seed in the row of hills last planted, and mark the rows as the machines are drawn across the field.

The invention consists in the construction and combination of the various parts of the potato-planter, as will be hereinafter fully described and then claimed.

A are the drive-wheels, one or both of which are rigidly attached to the axle B, so as to carry the said axle with them in their revolution. The wheels A are about three feet in diameter, have tires about eight inches wide, and are placed upon the axle B at a distance apart from center to center of about six feet, so as to serve as rollers to press the soil down upon the row of hills last planted, and to mark the ground for the row of hills to be planted at the next passage of the machine. The axle B revolves in bearings in the side bars of the frame C, and in the longitudinal bars D, placed upon the opposite sides of and equally distant from the central line of the machine, and attached at their rear ends to the rear cross-bar of the frame C.

The forward ends of the bars D are attached to the cross-bar E, the ends of which are secured to the side bars of the frame C in such positions that the said cross-bar will serve as a guard to keep the seed in the pockets of the seed-dropping wheel F, attached to the center of the axle B. The seed-dropping wheel F is made about two feet in diameter, and has in its face pockets G, to receive the seed from the hopper H and drop it to the ground. The lower edges of the front and rear of the hopper H are recessed to fit upon the seed-dropping wheel, and are placed at such a distance apart that about fourteen inches of the face of the said wheel will be exposed within the said hopper, so that the pockets G will readily become filled with seed. A knife or scraper, H', is secured to the lower edge of the front of the hopper H and projects slightly over the wheel F, serving to remove surplus seed from the pockets G. The latter may be provided with false spring-bottoms, of usual construction, to insure the prompt deposition of the seed when the pockets enter the spout. The rear side of the cross bar E is concaved to receive and fit upon the forward part of the seed-dropping wheel F, and serve as a guard to keep the seed in the pockets G until it has been carried down so low as to fall within the spout I and pass through the said spout into the furrow opened by the plow J. The upper edge of the spout I is attached to the forward parts of the longitudinal bars D and the middle part of the cross-bar E, so that the upper end of the said spout will inclose the lower part of the seed-dropping wheel F.

The furrow-opening plow J is attached to the lower end of the standard K, which passes up through a hole in the rear part of the tongue L, where it is secured in place adjustably by a set-screw, M, or other suitable means, so that it can be readily raised and lowered to cause it to enter the ground to any desired depth. The seed is covered by the two plows N, attached to the lower ends of the standards O, which pass up through holes in the rear parts of the longitudinal bars D, where they are secured in place adjustably by set-screws P, or other suitable means, so that they can be readily adjusted to cause the plows N to cover the potatoes to any desired depth. With this construction, the hopper H being attached to the frame C, riding upon the axle B, the said hopper will be rocked as the machine is drawn forward over the surface of the ground, and the potatoes will be made to roll about within the said hopper, so that they will readily pass into the pockets of the wheel F. The frame of the planter may be provided with a seat for the driver, to enable him to guide the implement more easily.

Having thus described my invention, what I claim as new, and desire to secure by Letters Patent, is—

A potato-planter constructed substantially as herein shown and described, and consisting of the wheels A, the long axle B, rigidly connected with one or both of the said wheels A, the frame C, riding upon the axle B, and provided with two longitudinal bars, D, and a cross-bar, E, having the rear side of its middle part recessed, the seed-dropping wheel F, provided with pockets G in its face and attached to the center of the axle B, the hopper H, fitting upon the upper part of the wheel F and attached to the said bars D E, the conducting-spout I, attached to the said bars D E and covering the lower part of the wheel F, the tongue L, attached to the forward part of the machine-frame, the plow and standard J K, attached to the said tongue for opening a furrow to receive seed, and the plows and standards N O, attached to the bars D, for covering the seed, as set forth.

WILLIAM CARLISLE DAVIDSON.

Witnesses:
 JOSEPH BLAKE,
 A. SMITH.